(12) United States Patent
Wang et al.

(10) Patent No.: US 10,901,269 B2
(45) Date of Patent: Jan. 26, 2021

(54) PIXEL ARRAY

(71) Applicant: Au Optronics Corporation, Hsinchu (TW)

(72) Inventors: Jia-Hong Wang, Kaohsiung (TW); Ya-Ling Hsu, New Taipei (TW); Chen-Hsien Liao, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/777,825

(22) Filed: Jan. 30, 2020

(65) Prior Publication Data

US 2020/0166788 A1   May 28, 2020

Related U.S. Application Data

(62) Division of application No. 15/806,332, filed on Nov. 8, 2017, now Pat. No. 10,598,992.

(30) Foreign Application Priority Data

May 9, 2017 (TW) .............................. 106115224 A

(51) Int. Cl.
*G02F 1/1343* (2006.01)
*G02F 1/1362* (2006.01)

(52) U.S. Cl.
CPC ........ *G02F 1/1343* (2013.01); *G02F 1/13624* (2013.01); *G02F 1/136213* (2013.01); *G02F 1/136259* (2013.01); *G02F 1/136286* (2013.01); *G02F 2001/134345* (2013.01)

(58) Field of Classification Search
None
See application file for complete search history.

(56) References Cited

U.S. PATENT DOCUMENTS

2016/0202581 A1*  7/2016  Yu ..................... G02F 1/134309
                                                         257/72
2016/0282682 A1*  9/2016  Kim .................. G02F 1/133707

* cited by examiner

*Primary Examiner* — Richard H Kim
(74) *Attorney, Agent, or Firm* — JCIPRNET

(57) ABSTRACT

A pixel array including a first common line, a first conductive line, a first connection line, a second common line, a second conductive line, a third common line, and a first connection structure is provided. The first common line is located on a first side of a first scan line. The first conductive line includes a first extending portion and a second extending portion. The first connection line crosses the first scan line so as to electrically connect the first extending portion to the second extending portion. The second common line is located on a first side of a second scan line. The second conductive line includes a third extending portion and a fourth extending portion. The first connection structure electrically connect the second common line to the third common line.

9 Claims, 9 Drawing Sheets

PIXEL ARRAY

CROSS-REFERENCE TO RELATED APPLICATION

This application is a divisional application of and claims the priority benefit of a prior application Ser. No. 15/806,332, filed on Nov. 8, 2017, now allowed, which claims the priority benefit of Taiwan application Ser. No. 106115224, filed on May 9, 2017. The entirety of each of the above-mentioned patent applications is hereby incorporated by reference herein and made a part of this specification.

BACKGROUND OF THE INVENTION

1. Field of the Invention

The invention relates to a pixel array, and more particularly, to a pixel array having connection lines.

2. Description of Related Art

In general, a liquid crystal display device is provided with upper and lower substrates. The upper substrate has an electrode film, the lower substrate has a common electrode, and a liquid crystal medium is located between the electrode film and the common electrode. In the prior art, a pixel electrode is short-circuited with the common electrode when a pixel structure in the liquid crystal display device is malfunction. The malfunction pixel structure can become a dark spot because the electrode film and the common electrode are connected to a same common voltage.

However, given that the electrode film and the common electrode are both connected to the same voltage, since the liquid crystal medium cannot be supplied with a sufficient voltage difference, a transmittance of the liquid crystal display device is therefore restricted. Accordingly, there is an urgent need for a solution to the above problem.

SUMMARY OF THE INVENTION

The invention provides a pixel array capable of increasing the transmittance of the liquid crystal display device.

A pixel array of the invention includes a first scan line, a second scan line, a first data line, a second data line, a first pixel electrode, a second pixel electrode, a third pixel electrode, a fourth pixel electrode, a first switch element, a second switch element, a third switch element, a fourth switch element, a first common line, a second common line, a first conductive line, a second conductive line, a third common line, and a first connection structure. The first data line and the second data line are respectively disposed intersecting with the first scan line and the second scan line. The first pixel electrode and the second pixel electrode are respectively disposed on a first side of the first scan line and a second side of the first scan line. The first switch element is electrically connected to the first scan line, the first data line and the first pixel electrode. The second switch element is electrically connected to the second pixel electrode. The first common line is located on the first side of the first scan line. The first conductive line includes a first extending portion and a second extending portion. The first extending portion is located on the first side of the first scan line, and the second extending portion is located on the second side of the first scan line. The first connection line crosses the first scan line so as to electrically connect the first extending portion to the second extending portion. The third pixel electrode and the fourth pixel electrode are respectively disposed on a first side of the second scan line and a second side of the second scan line. The third switch element is electrically connected to the second scan line, the second data line and the third pixel electrode. The fourth switch element is electrically connected to the fourth pixel electrode. The second common line is located on the first side of the second scan line. The second conductive line includes a third extending portion and a fourth extending portion. The third extending portion is located on the first side of the second scan line, and the fourth extending portion is located on the second side of the second scan line. The first connection structure is electrically connected to the second common line and the third common line. The first common line, the second common line and the third common line are electrically connected to a first voltage, and the first conductive line and the second conductive line are electrically connected to a second voltage.

A pixel array of the invention includes a scan line, a data line, a first pixel electrode, a second pixel electrode, a first switch element, a second switch element, a first common line, a first conductive line, a connection line and a third common line. The data line is disposed intersecting with the scan line. The first pixel electrode and the second pixel electrode are respectively disposed on a first side of the scan line and a second side of the scan line. The first switch element is electrically connected to the scan line, the data line and the first pixel electrode. The second switch element is electrically connected to the second pixel electrode. The first common line is located on the first side of the scan line. The first conductive line includes a first extending portion and a second extending portion. The first extending portion is located on the first side of the scan line, and the second extending portion is located on the second side of the scan line. The connection line crosses the scan line so as to electrically connect the first extending portion to the second extending portion. The third common line includes a third extending portion and a fourth extending portion. The third extending portion extends along an extending direction of the scan line, the fourth extending portion is disposed on the data line, and the fourth extending portion is connected to the third extending portion. The first common line and the third common line are electrically connected to a first voltage, and the first conductive line is electrically connected to a second voltage.

Based on the above, because the first conductive line and the second conductive line are applied with the second voltage different from the first voltage, the transmittance of the liquid crystal display device may be significantly increased by utilizing a voltage difference between the first voltage and the second voltage. Moreover, a damaged pixel unit can be repaired into the dark spot through the first common line, the second common line or the third common line.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
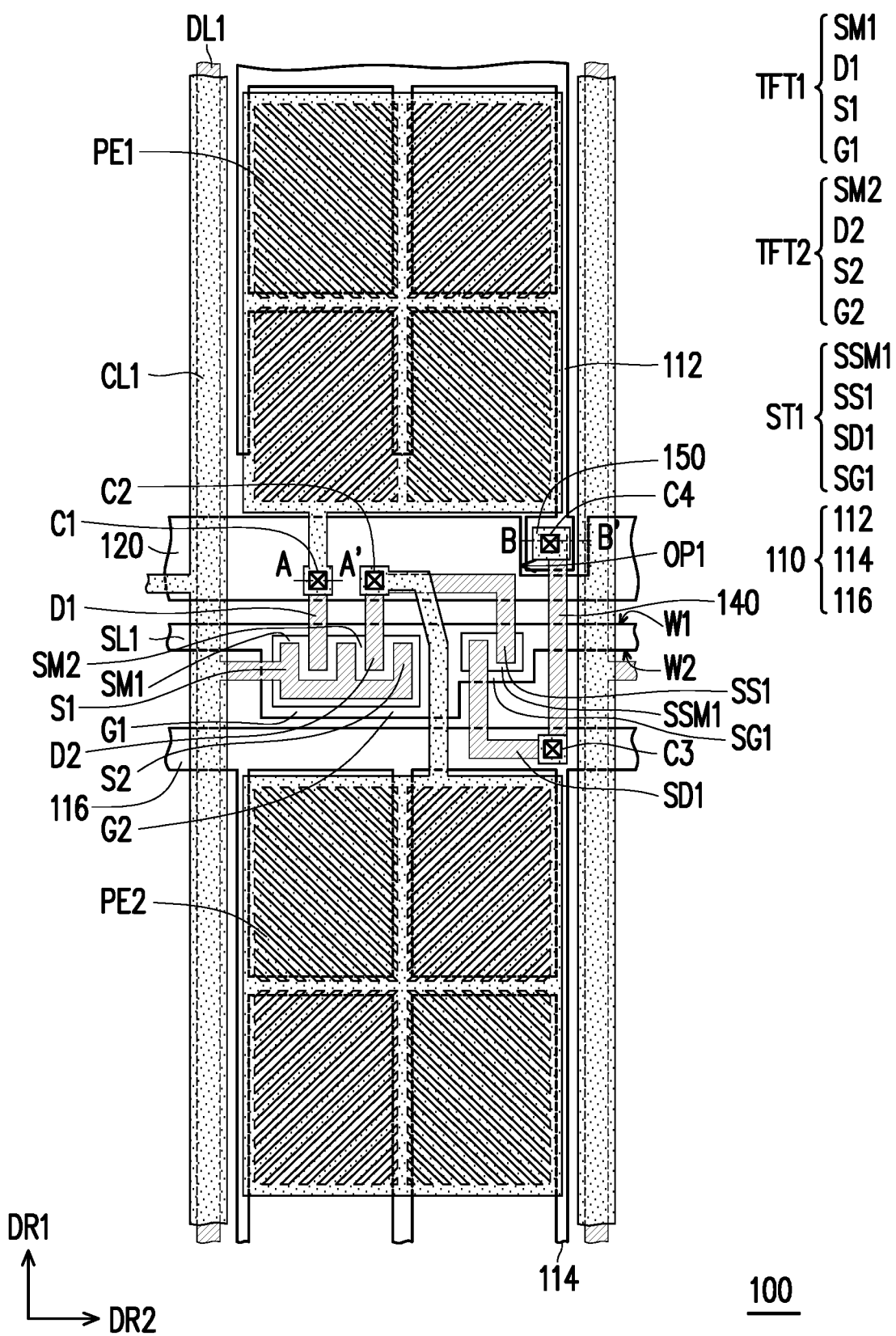
FIG. 1A is a top view of a pixel unit in a pixel array according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The following describes the embodiments with reference to the accompanying drawings in detail, so as to make the aspects of the present disclosure more comprehensible. However, the mentioned embodiments are not intended to limit the scope of the present disclosure, and the description of the operation of a structure is not intended to limit an execution sequence. Any device with equivalent functions that is produced from a structure formed by a recombination of elements shall fall within the scope of the present disclosure. Besides, according to industry standards and practices, the drawings are merely intended to assist the description, and are not drawn according to original dimensions. In practice, dimensions of various features may be arbitrarily increased or decreased to facilitate the description. Same elements in the description below are indicated by a same reference sign, so as to facilitate the comprehension.

In the present disclosure, when an element is "connected" or "coupled", it may indicate that the element is "electrically connected" or "electrically coupled". "Connected" or "coupled" may further be used to indicate that two or more elements operate cooperatively or interact with each other. Oppositely, when an element is "directly on another element" or "directly connected to" another element, there is no intermediate element. As used herein, "connection" may refer to physical and/or electrical connection.

As used herein, "about", "similar", or "substantially" includes the value and an average value of values in an acceptable deviation range of a specific value determined by a person of ordinary skill in the art, taking the discussed measurement and a specific quantity of errors related to the measurement (that is, limitations of a measurement system) into consideration. For example, "substantially" may indicate within one or more standard deviations of the value, or within ±10%, or ±5%.

Unless otherwise defined, as used herein, all the terms (including technical and scientific terms) have the same meanings as commonly understood by a person of ordinary skill in the art. It will be further understood that terms defined in commonly used dictionaries shall be comprehended as meanings the same as the meanings in the related art and the context of the present disclosure, and shall not be comprehended as ideal or excessively formal meanings, unless this specification clearly defined otherwise.

Figure 1B:
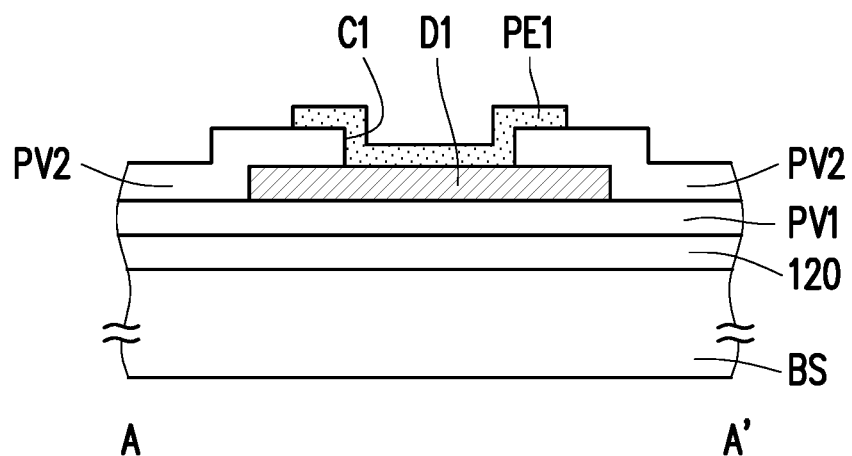
FIG. 1B is a cross-sectional view taken along line AA' of FIG. 1A.
Figure 1C:
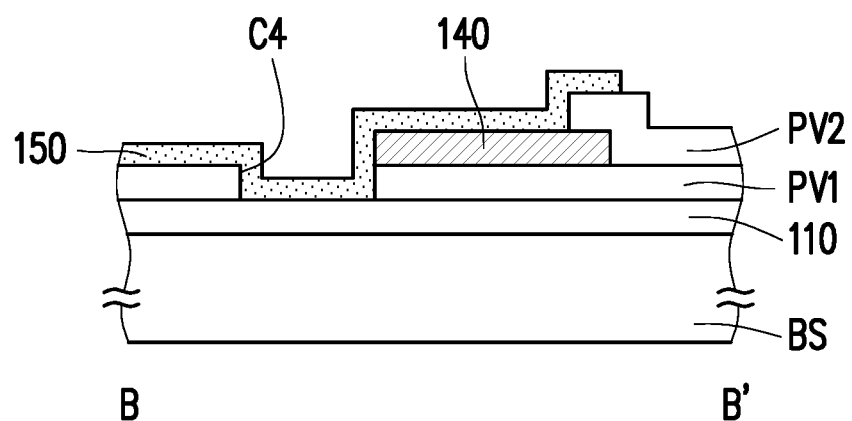
FIG. 1C is a cross-sectional view taken along line BB' of FIG. 1A.
Figure 1D:
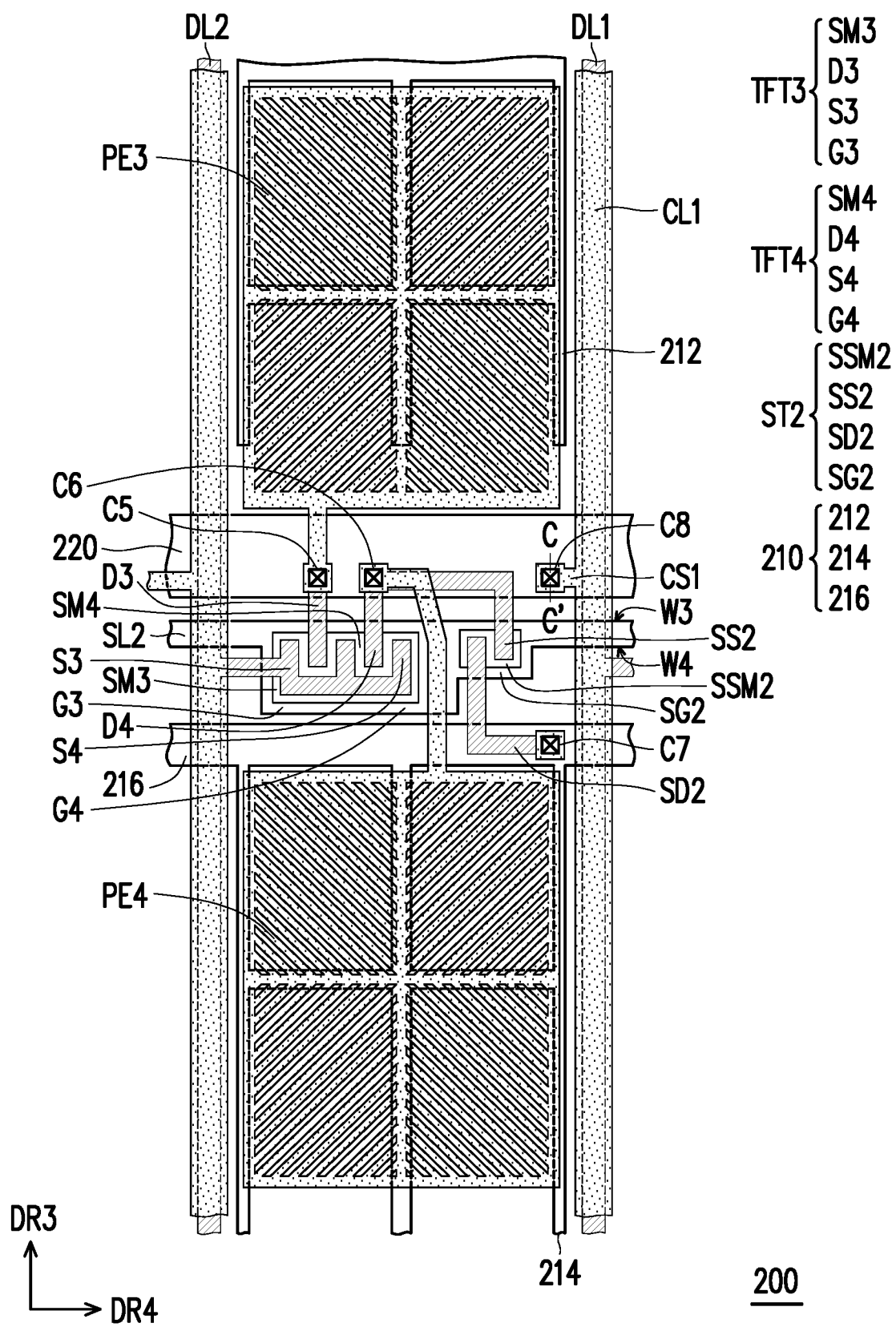
FIG. 1D is a top view of another pixel unit in a pixel array according to an embodiment of the invention.
Figure 1E:
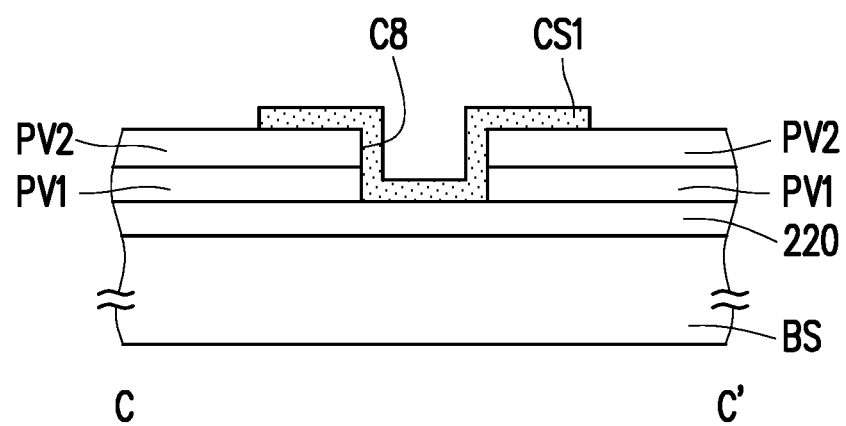
FIG. 1E is a cross-sectional view taken along line CC' of FIG. 1D.

FIG. 1A is a top view of a pixel unit in a pixel array according to an embodiment of the invention. FIG. 1B is a cross-sectional view taken along line AA' of FIG. 1A. FIG. 1C is a cross-sectional view taken along line BB' of FIG. 1A. FIG. 1D is a top view of another pixel unit in a pixel array according to an embodiment of the invention. FIG. 1E is a cross-sectional view taken along line CC' of FIG. 1D.

With reference to FIG. 1A to FIG. 1E, the pixel array of the present embodiment includes a pixel unit 100 and a pixel unit 200. In an embodiment, the pixel unit 100 and the pixel unit 200 are formed on a substrate BS.

In the pixel unit 100, a first data line DL1 is disposed intersecting with a first scan line SL1. A first pixel electrode PE1 and a second pixel electrode PE2 are respectively disposed on a first side W1 and a second side W2 of the first scan line SL1. In an embodiment, the first pixel electrode PE1 and the second pixel electrode PE2 are respectively disposed on an upper side and a lower side of the first scan line SL1.

Referring to FIG. 1A, FIG. 1B and FIG. 1C together, a first switch element TFT1 is electrically connected to the first scan lines SL1, the first data line DL1 and the first pixel electrode PE1. The first switch element TFT1 includes a gate electrode G1, a semiconductor layer SM1, a source electrode S1 and a drain electrode D1. The gate electrode G1 is electrically connected to the first scan line SL1, the source electrode S1 is electrically connected to the first data line DL1, and the first pixel electrode PE1 is electrically connected to the drain electrode D1 through a contact C1. At least part of the semiconductor layer SM1 is located between the gate electrode G1, the source electrode S1 and the drain electrode D1. A second switch element TFT2 is electrically connected to the second pixel electrode PE2. The second switch element TFT2 includes a gate electrode G2, a semiconductor layer SM2, a source electrode S2 and a drain electrode D2. In an embodiment, the gate electrode G2 is electrically connected to the first scan line SL1, the source electrode S2 is electrically connected to the first data line DL1, and the second pixel electrode PE2 is electrically connected to the drain electrode D2 through a contact C2. At least part of the semiconductor layer SM2 is located between the gate electrode G2, the source electrode S2 and the drain electrode D2. In an embodiment, the source electrode S2 of the second switch element TFT2 may be electrically connected to the source electrode S1. More specifically, the gate electrode G2 of the second switch element TFT2 is electrically connected to the first scan line SL1, and the source electrode S2 of the second switch element TFT2 is electrically connected to the first data line DL1 through the first switch element TFT1.

In the present embodiment, the contact C1 is located above the drain electrode D1 and a first common line 120. An insulation layer PV1 is sandwiched between the drain electrode D1 and the first common line 120, an insulation layer PV2 is sandwiched between the first pixel electrode PE1 and the drain electrode D1, and the contact C1 is located in the insulation layer PV2. A part of the first pixel electrode PE1 is filled in the contact C1 to be electrically connected to the drain electrode D1.

A first sharing element ST1 includes a gate electrode SG1, a semiconductor layer SSM1, a source electrode SS1 and a drain electrode SD1. The source electrode SS1 is electrically connected to the second pixel electrode PE2 through the contact C2, and the source electrode SS1 of the first sharing element ST1 is electrically connected to the drain electrode D2 of the second switch element TFT2. The drain electrode SD1 of the first sharing element ST1 is electrically connected to a first conductive line 110 through a contact C3. The gate electrode SG1 of the first sharing element ST1 is electrically connected to the first scan line SL1. At least part of the semiconductor layer SSM1 is located between the gate electrode SG1, the source electrode SS1 and the drain electrode SD1.

The first conductive line 110 includes a first extending portion 112 and a second extending portion 114. The first extending portion 112 is located on the first side W1 of the first scan line SL1, the second extending portion 114 is located on the second side W2 of the first scan line SL1, and the first extending portion 112 and the second extending portion 114 are structurally separated from each other at where the first scan line SL1 is located. In an embodiment, the first common line 120 is further sandwiched between the first extending portion 112 and the first scan line SL1, but the invention is not limited thereto. In other embodiments, the first common line 120 may be located between the second extending portion 114 and the first scan line SL1.

The first extending portion 112 and the second extending portion 114 extend along an extending direction DR1 of the first data line DL1. In an embodiment, the first conductive line 110 further includes a first branch portion 116 extending along an extending direction DR2 of the first scan line SL1. In the present embodiment, the first branch portion 116 is located on the second side W2 of the first scan line SL1 and connected to the second extending portion 114, but the invention is not limited thereto. In other embodiments, the first branch portion 116 may be located on the first side W1 of the first scan line SL1 and connected to the first extending portion 112.

A first connection line 140 crosses the first scan line SL1 so as to electrically connect the first extending portion 112 to the second extending portion 114. In an embodiment, the first connection line 140 crosses the first scan line SL1 and the first connection line 120 so as to electrically connect the first extending portion 112 to the second extending portion 114. In an embodiment, one end of the first connection line 140 is electrically connected to the second extending portion 114 of the first conductive line 110 through the contact C3, whereas the other end of the first connection line 140 is electrically connected to the first extending portion 112 of the first conductive line 110 through a contact C4. In an embodiment, the first connection line 140 is located below a black matrix (not illustrated).

The contact C4 is located on the first extending portion 112, the insulation layer PV1 is sandwiched between the first extending portion 112 and the first connection line 140, and the contact C4 is located in the insulation layer PV1. A conductive layer 150 is filled in the contact C4 so as to electrically connect the first connection line 140 to the first extending portion 112 of the first conductive line 110. In an embodiment, the conductive layer 150 and the first pixel electrode PE1 are made of the same layer.

The contact C3 is located on the second extending portion 114. The insulation layer PV1 is sandwiched between the second extending portion 114 and the first connection line 140, and the contact C3 is located in the insulation layer PV1. The conductive layer 150 is filled in the contact C3 so as to electrically connect the first connection line 140 to the second extending portion 114 of the first conductive line 110. In an embodiment, the conductive layer 150 and the first pixel electrode PE1 are made of the same layer. In an embodiment, the conductive layer 150 filled in the contact C3 is separated from the conductive layer 150 filled in the contact C4.

In an embodiment, an extending direction of a third common line CL1 is substantially identical to the extending direction DR1 of the first data line DL1. In the present embodiment, the third common line CL1 is located on the first data line DL1 and at least covers a part of the first data line DL1, but the invention is not limited thereto.

In an embodiment, the first common line 120 is located on the first side W1 of the first scan line SL1. The first common line 120 includes a groove OP1, and at least part of the first extending portion 112 of the first conductive line 110 is located in the groove OP1. In other words, in a vertical projecting direction of the substrate BS, said at least part of the first extending portion 112 overlaps with an accommodating space of the groove OP1 of the first common line 120.

Referring to FIG. 1D and FIG. 1E together, in the pixel unit 200, a second data line DL2 is disposed intersecting with a second scan line SL2. In an embodiment, the second scan line SL2 of the pixel unit 200 is electrically connected to the first scan line SL1 of the pixel unit 100. In other words, the second scan line SL2 and the first scan line SL1 are located on the same row in the pixel array, but the invention is not limited thereto. In other embodiments, the second scan line SL2 and the first scan line SL1 are separated and located on different rows in the pixel array. A third pixel electrode PE3 and a fourth pixel electrode PE4 are respectively disposed on a first side W3 and a second side W4 of the second scan line SL2. In an embodiment, the third pixel electrode PE3 and the fourth pixel electrode PE4 are respectively disposed on an upper side and a lower side of the second scan line SL2. In an embodiment, an extending direction DR3 of the second data line DL2 is substantially identical to the extending direction DR1 of the first data line DL1, and an extending direction DR4 of the second scan line SL2 is substantially identical to the extending direction DR2 of the first scan line SL1.

A third switch element TFT3 is electrically connected to the second scan line SL2, the second data line DL2 and the third pixel electrode PE3. The third switch element TFT3 includes a gate electrode G3, a semiconductor layer SM3, a source electrode S3 and a drain electrode D3. The gate electrode G3 is electrically connected to the second scan line SL2, the source electrode S3 is electrically connected to the second data line DL2, and the third pixel electrode PE3 is electrically connected to the drain electrode D3 through a contact C5. At least part of the semiconductor layer SM3 is located between the gate electrode G3, the source electrode S3 and the drain electrode D3.

A fourth switch element TFT4 is electrically connected to the fourth pixel electrode PE4. The fourth switch element TFT4 includes a gate electrode G4, a semiconductor layer SM4, a source electrode S4 and a drain electrode D4. In an embodiment, the gate electrode G4 is electrically connected to the second scan line SL2, the source electrode S4 is electrically connected to the second data line DL2, and the fourth pixel electrode PE4 is electrically connected to the drain electrode D4 through a contact C6. At least part of the semiconductor layer SM4 is located between the gate electrode G4, the source electrode S4 and the drain electrode D4. In an embodiment, the source electrode S4 of the fourth switch element TFT4 may be electrically connected to the source electrode S3. More specifically, the gate electrode G4 of the fourth switch element TFT4 is electrically connected to the second scan line SL2, and the source electrode S4 of the fourth switch element TFT4 is electrically connected to the second data line DL2 through the third switch element TFT3.

A second sharing element ST2 includes a gate electrode SG2, a semiconductor layer SSM2, a source electrode SS2 and a drain electrode SD2. The source electrode SS2 is electrically connected to the fourth pixel electrode PE4 through the contact C6, and the source electrode SS2 of the second sharing element ST2 is electrically connected to the drain electrode D4 of the fourth switch element TFT4. The drain electrode SD2 of the second sharing element ST2 is electrically connected to a second conductive line 210 through a contact C7. The gate electrode SG2 of the second sharing element ST2 is electrically connected to the second scan line SL2. At least part of the semiconductor layer SSM2 is located between the gate electrode SG2, the source electrode SS2 and the drain electrode SD2.

The second conductive line 210 includes a third extending portion 212 and a fourth extending portion 214. The third extending portion 212 is located on the first side W3 of the second scan line SL2, and the fourth extending portion 214 is located on the second side W4 of the second scan line SL2. The third extending portion 212 and the fourth extending portion 214 extend along the extending direction DR3 of the second data line DL2. In an embodiment, the second conductive line 210 further includes a second branch portion 216 extending along the extending direction DR4 of the second scan line SL2. In an embodiment, the second branch portion 216 of the pixel unit 200 is electrically connected to the first branch portion 116 of the pixel unit 100. In an embodiment, the first branch portion 116 is electrically connected to the fourth extending portion 214 of the second conductive line 210 through the second branch portion 216 of the second conductive line 210. In an embodiment, the first conductive line 110 and the second conductive line 210 commonly constitute a mesh structure in the extending direction of the scan line and the extending direction of the data line, such that the pixel array can provide a more uniform voltage distribution.

A second common line 220 is located on the first side W3 of the second scan line SL2. In an embodiment, the second common line 220 of the pixel unit 200 is electrically connected to the first common line 120 of the pixel unit 100.

In an embodiment, the third common line CL1 is electrically connected to the second common line 220. In an embodiment, the third common line CL1 is disposed intersecting with the second common line 220, and the third common line CL1 is electrically connected to the second common line 220 through a first connection structure CS1. The third common line CL1 and the second common line 220 are applied with the same voltage. In an embodiment, the pixel unit 200 is adjacent to the pixel unit 100, the second data line DL2 is adjacent to the first data line DL1, and the third common line CL1 is located above the first data line DL1.

A contact C8 is located on the second common line 220. The insulation layer PV1 is sandwiched between the insulation layer PV2 and the second common line 220, the contact C8 is located in the insulation layer PV1 and the insulation layer PV2, at least part of the first connection structure CS1 is electrically connected to the second common line 220 through the contact C8, and the first connection structure CS1 is electrically connected to the third common line CL1. In the present embodiment, the insulation layer PV1 and the insulation layer PV2 are sandwiched between the first connection structure CS1 and the second common line 220, but the invention is not limited thereto. In other embodiments, only one of the insulation layer PV1 and the insulation layer PV2 is sandwiched between the first connection structure CS1 and the second common line 220. In an embodiment, the first connection structure CS1 and the third common line CL1 are made of the same layer. In an embodiment, the first common line 120, the second common line 220 and the third common line CL1 commonly constitute a mesh structure in the extending direction of the scan line and the extending direction of the data line, such that the pixel array can provide a more uniform voltage distribution.

In the pixel array of the present embodiment, the first common line 120, the second common line 220 and the third common line CL1 are electrically connected to a first voltage, and the first conductive line 110 and the second conductive line 210 are electrically connected to a second voltage. In an embodiment, a liquid crystal display device including the pixel array of the invention is provided with upper and lower substrates. The upper substrate has an electrode film applied with the first voltage, and the first conductive line 110 and the second conductive line 210 are applied with the second voltage different from the first voltage. Accordingly, the transmittance of the liquid crystal display device may be significantly increased by utilizing the voltage difference between the first voltage and the second voltage. In addition, when a pixel unit is damaged, the damaged pixel unit can be repaired into the dark spot through the first common line 120, the second common line 220 or the third common line CL1.

In an embodiment, the first scan line SL1, the second scan line SL2, the first common line 120, the second common line 220, the first conductive line 110 and the second conductive line 210 are made of the same layer. In an embodiment, the first data line DL1, the second data line DL2 and the first connection line 140 are made of the same layer. In an embodiment, the first pixel electrode PE1, the second pixel electrode PE2, the third pixel electrode PE3, the fourth pixel electrode PE4, the third common line CL1 and the first connection structure CS1 are made of the same layer.

Based on the above, in the pixel array of the present embodiment, the first common line 120, the second common line 220 and the third common line CL1 are electrically connected to the first voltage, and the first conductive line 110 and the second conductive line 210 are electrically connected to the second voltage. So the voltage difference applied to the liquid crystal medium in the liquid crystal display device may be increased so as to effectively increase the transmittance of the liquid crystal display device. In addition, when a pixel unit is damaged, the damaged pixel unit can be repaired into the dark spot through the first common line 120, the second common line 220 or the third common line CL1.

Figure 2A:
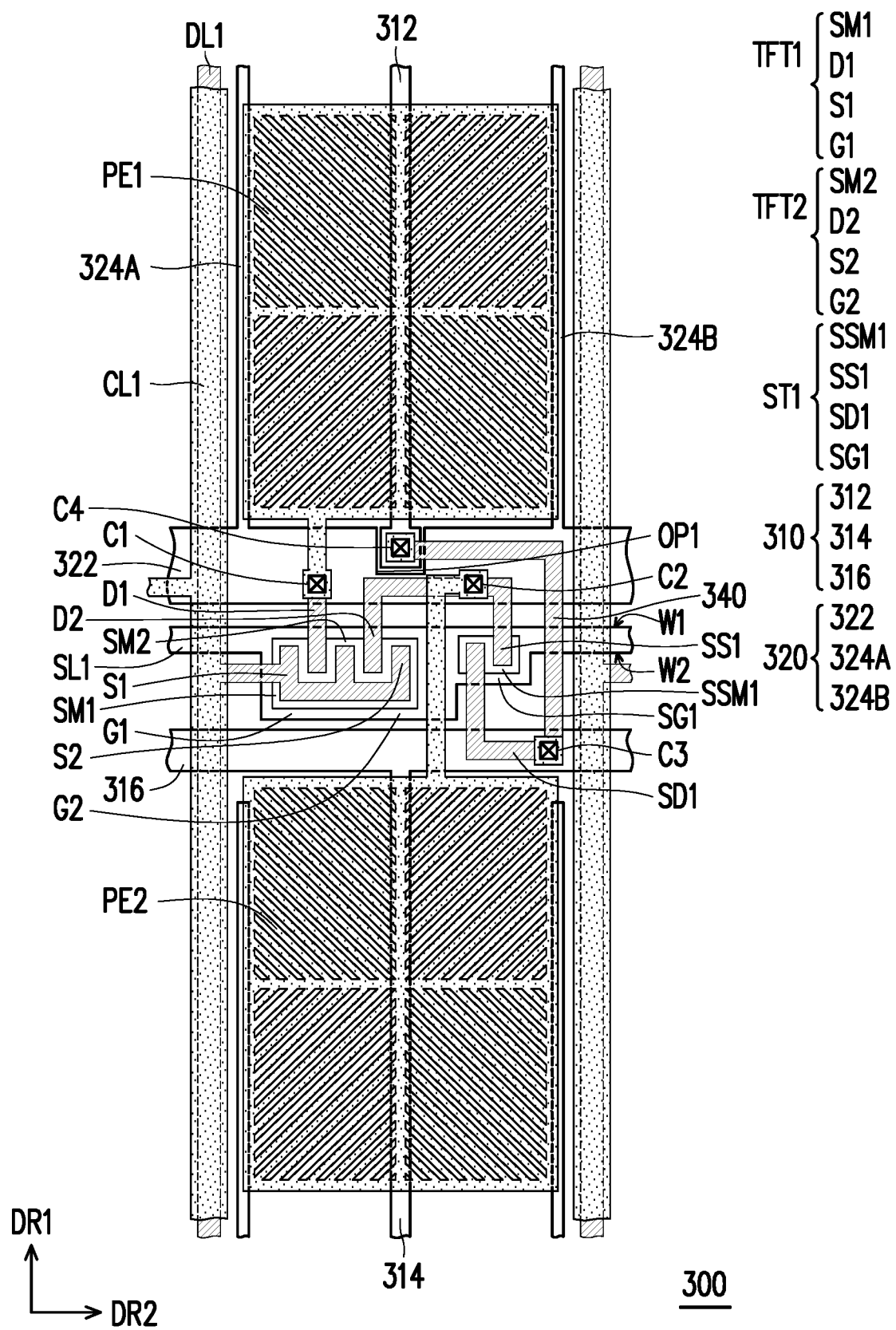
FIG. 2A is a top view of a pixel unit in a pixel array according to another embodiment of the invention.
Figure 2B:
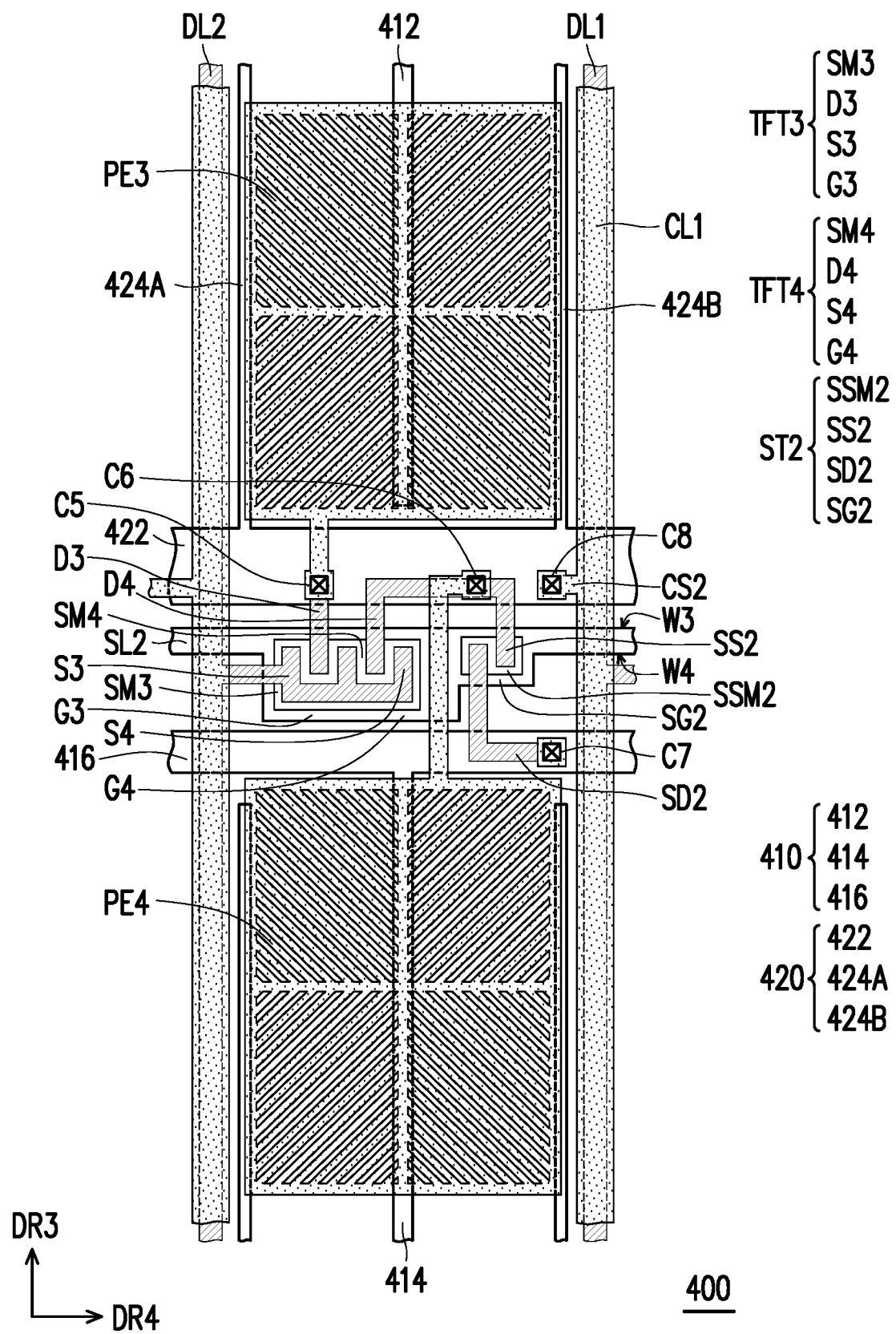
FIG. 2B is a top view of another pixel unit in a pixel array according to another embodiment of the invention.

FIG. 2A is a top view of a pixel unit in a pixel array according to another embodiment of the invention. FIG. 2B is a top view of another pixel unit in a pixel array according to another embodiment of the invention. It should be noted that, the embodiment of FIG. 2A and FIG. 2B adopts the reference numbers and part of the content in the embodiment of FIG. 1A to FIG. 1E, where identical or similar reference numbers are used to indicate identical or similar components, and repeated description for the same technical contents is omitted. The omitted part of the description can refer to the foregoing embodiments, which are not repeated in the following embodiments.

A pixel array in the embodiment of FIG. 2A and FIG. 2B includes a pixel unit 300 and a pixel unit 400. The embodiment of FIG. 2A and FIG. 2B is different from the embodiment of FIG. 1A to FIG. 1E in that, in the embodiment of FIG. 2A and FIG. 2B, a first conductive line 310, a second conductive line 410, a first common line 320 and a second common line 420 are different from the first conductive line 110, the second conductive line 210, the first common line 120 and the second common line 220 in FIG. 1A to FIG. 1E.

With reference to FIG. 2A, in the pixel unit 300, the first conductive line 310 includes a first extending portion 312 and a second extending portion 314. The first extending portion 312 is located on the first side W1 of the first scan line SL1, and the second extending portion 314 is located on the second side W2 of the first scan line SL1. The first extending portion 312 and the second extending portion 314 extend along the extending direction DR1 of the first data line DL1. In an embodiment, the first conductive line 310 further includes a first branch portion 316 extending along the extending direction DR2 of the first scan line SL1. In the present embodiment, the first branch portion 316 is connected to the second extending portion 314, but the invention is not limited thereto. In other embodiments, the first branch portion 316 is connected to the first extending portion 312.

A first connection line 340 crosses the first scan line SL1 so as to electrically connect the first extending portion 312 to the second extending portion 314. In an embodiment, one end of the first connection line 340 is electrically connected to the second extending portion 314 of the first conductive line 310 through the contact C3, whereas the other end of the first connection line 340 is electrically connected to the first extending portion 312 of the first conductive line 310 through the contact C4.

In an embodiment, the first extending portion 312 of the first conductive line 310 is substantially overlapping with a middle part of the first pixel electrode PE1, and divides the first pixel electrode PE1 into left and right halves. In an embodiment, the first pixel electrode PE1 includes a plurality of slits with different extending directions, and the first extending portion 312 is located on the first pixel electrode PE1 at an intersection of the slits with the different extending directions. In an embodiment, the second extending portion 314 of the first conductive line 310 is substantially overlapping with a middle part of the second pixel electrode PE2, and divides the second pixel electrode PE2 into left and right halves. In an embodiment, the second pixel electrode PE2 includes a plurality of slits with different extending directions, and the second extending portion 314 is located on the second pixel electrode PE2 at an intersection of the slits with the different extending directions.

The first common line 320 includes a main portion 322, a trunk portion 324A and a trunk portion 324B. The main portion 322 extends along the extending direction DR2 of the first scan line SL1. The trunk portion 324A and the trunk portion 324B extend along the extending direction DR1 of the first data line DL1 and are connected to the main portion 322. In an embodiment, the trunk portion 324A and the trunk portion 324B overlap with an edge of the first pixel electrode PE1. In an embodiment, the trunk portion 324A and the trunk portion 324B are located on two sides of the first pixel electrode PE1. The first extending portion 312 of the first conductive line 310 is located between the trunk portion 324A and the trunk portion 324B. In the present embodiment, the first common line 320 can shelter electric fields of the pixel electrodes and the data lines, so that the pixel array can operate more stably.

With reference to FIG. 2B, in the pixel unit 400, the second conductive line 410 includes a third extending portion 412 and a fourth extending portion 414. The third extending portion 412 is located on the first side W3 of the second scan line SL2, and the fourth extending portion 414 is located on the second side W4 of the second scan line SL2. The third extending portion 412 and the fourth extending portion 414 extend along the extending direction DR3 of the second data line DL2. In an embodiment, the second conductive line 410 further includes a second branch portion 416 extending along the extending direction DR4 of the second scan line SL2. In an embodiment, the second branch portion 416 of the pixel unit 400 is electrically connected to the first branch portion 316 of the pixel unit 300. The first branch portion 316 of the pixel unit 300 is electrically connected to the second conductive line 410. In an embodiment, the first conductive line 310 and the second conductive line 410 commonly constitute a mesh structure in the extending direction of the scan line and the extending direction of the data line, such that the pixel array can provide a more uniform voltage distribution.

In an embodiment, the second common line 420 includes a main portion 422, a trunk portion 424A and a trunk portion 424B. The main portion 422 extends along the extending direction DR4 of the second scan line SL2. The trunk portion 424A and the trunk portion 424B extend along the extending direction DR3 of the second data line DL2 and are connected to the main portion 422. The second common line 420 is located on the first side W3 of the second scan line SL2. In an embodiment, the second common line 420 of the pixel unit 400 is electrically connected to the first common line 320 of the pixel unit 300. A first connection structure CS2 is electrically connected to the second common line 420 and the third common line CL1 through the contact C8. In an embodiment, the first common line 320, the second common line 420 and the third common line CL1 commonly constitute a mesh structure in the extending direction of the scan line and the extending direction of the data line, such that the pixel array can provide a more uniform voltage distribution.

In the pixel array of the present embodiment, the first common line 320, the second common line 420 and the third common line CL1 are electrically connected to a first voltage, and the first conductive line 310 and the second conductive line 410 are electrically connected to a second voltage. Based on the above, the first conductive line 310 and the second conductive line 410 are applied with the second voltage different from the first voltage. Accordingly, the transmittance of the liquid crystal display device may be significantly increased by utilizing the voltage difference between the first voltage and the second voltage. In addition, if a pixel unit is damaged, the damaged pixel unit can be repaired into the dark spot through the first common line 320, the second common line 420 or the third common line CL1.

Figure 3:
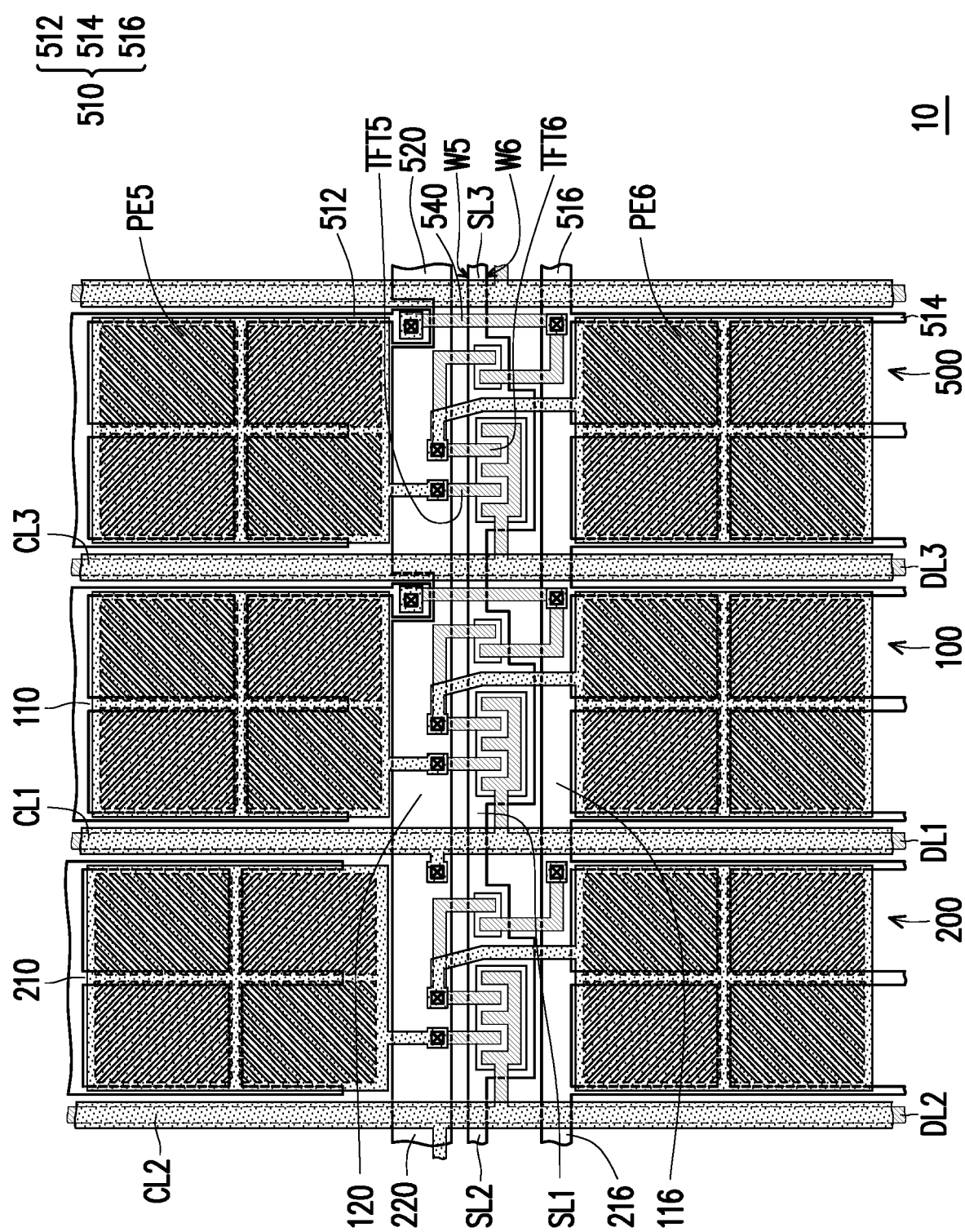
FIG. 3 is a top view of a pixel array according to further another embodiment of the invention.

FIG. 3 is a top view of a pixel array 10 according to further another embodiment of the invention. It should be noted that, the embodiment of FIG. 3 adopts the reference numbers and part of the content in the embodiment of FIG. 1A to FIG. 1E, where identical or similar reference numbers are used to indicate identical or similar components, and repeated description for the same technical contents is omitted. The omitted part of the description can refer to the foregoing embodiments, which are not repeated in the following embodiments.

With reference to FIG. 3, the pixel array 10 includes the pixel unit 100, the pixel unit 200 and a pixel unit 500, where the pixel unit 500 is similar to the pixel unit 100.

In the pixel array 10, the first scan line SL1 electrically connect the second scan line SL2 to a third scan line SL3, and the first data line DL1 is located between the second data line DL2 and a third data line DL3. In an embodiment, extending directions of the first data line DL1, the second data line DL2 and third data line DL3 are substantially identical, and extending directions of the first scan line SL1, the second scan line SL2 and the third scan line SL3 are substantially identical.

A fifth pixel electrode PE5 and a sixth pixel electrode PE6 are respectively disposed on a first side W5 of the third scan line SL3 and a second side W6 of the third scan line SL3. A fifth switch element TFT5 is electrically connected to the third scan line SL3, the third data line DL3 and the fifth pixel electrode PE5. A sixth switch element TFT6 is electrically connected to the sixth pixel electrode PE6.

A fourth common line 520 is located on the first side W5 of the third scan line SL3. A third conductive line 510 includes a fifth extending portion 512 and a sixth extending portion 514. The fifth extending portion 512 is located on the first side W5 of the third scan line SL3, and the sixth extending portion 514 is located on the second side W6 of the third scan line SL3. A second connection line 540 crosses the third scan line SL3 so as to electrically connect the fifth extending portion 512 to the sixth extending portion 514. In an embodiment, the fifth extending portion 512 and the sixth extending portion 514 extend along an extending direction of the third data line DL3, and the third conductive line 510 further includes a third branch portion 516 extending along the extending direction of the third scan line SL3. The first branch portion 116, the second branch portion 216 and the third branch portion 516 are electrically connected to each other. In the present embodiment, the first conductive line 110, the second conductive line 210 and the third conductive line 510 are electrically connected to the second voltage.

The third common line CL1 is located above the first data line DL1, a fifth common line CL2 is located above the second data line DL2, and a sixth common line CL3 is located above the third data line DL3. In an embodiment, the third common line CL1, the fifth common line CL2 and the sixth common line CL3 are made of the same layer. The first common line 120, the second common line 220, the third common line CL1, the fourth common line 520 are electrically connected to the first voltage.

In an embodiment, a quantity ratio of the connection lines to the connection structures in the pixel array is 2 to 1, but the invention is not limited thereto. In other embodiments, the quantity ratio of the connection lines to the connection structures in the pixel array may be adjusted based on actual requirements.

Based on the above, the first conductive line 110, the second conductive line 210 and the third conductive line 510 in the pixel array 10 are applied with the second voltage different from the first voltage. Accordingly, the transmittance of the liquid crystal display device may be significantly increased by utilizing the voltage difference between the first voltage and the second voltage. In addition, when a pixel unit is damaged, the damaged pixel unit can be repaired into the dark spot through the first common line 120, the second common line 220, the third common line CL1, the fourth common line 520, the fifth common line CL2 or the sixth common line CL3.

Figure 4:
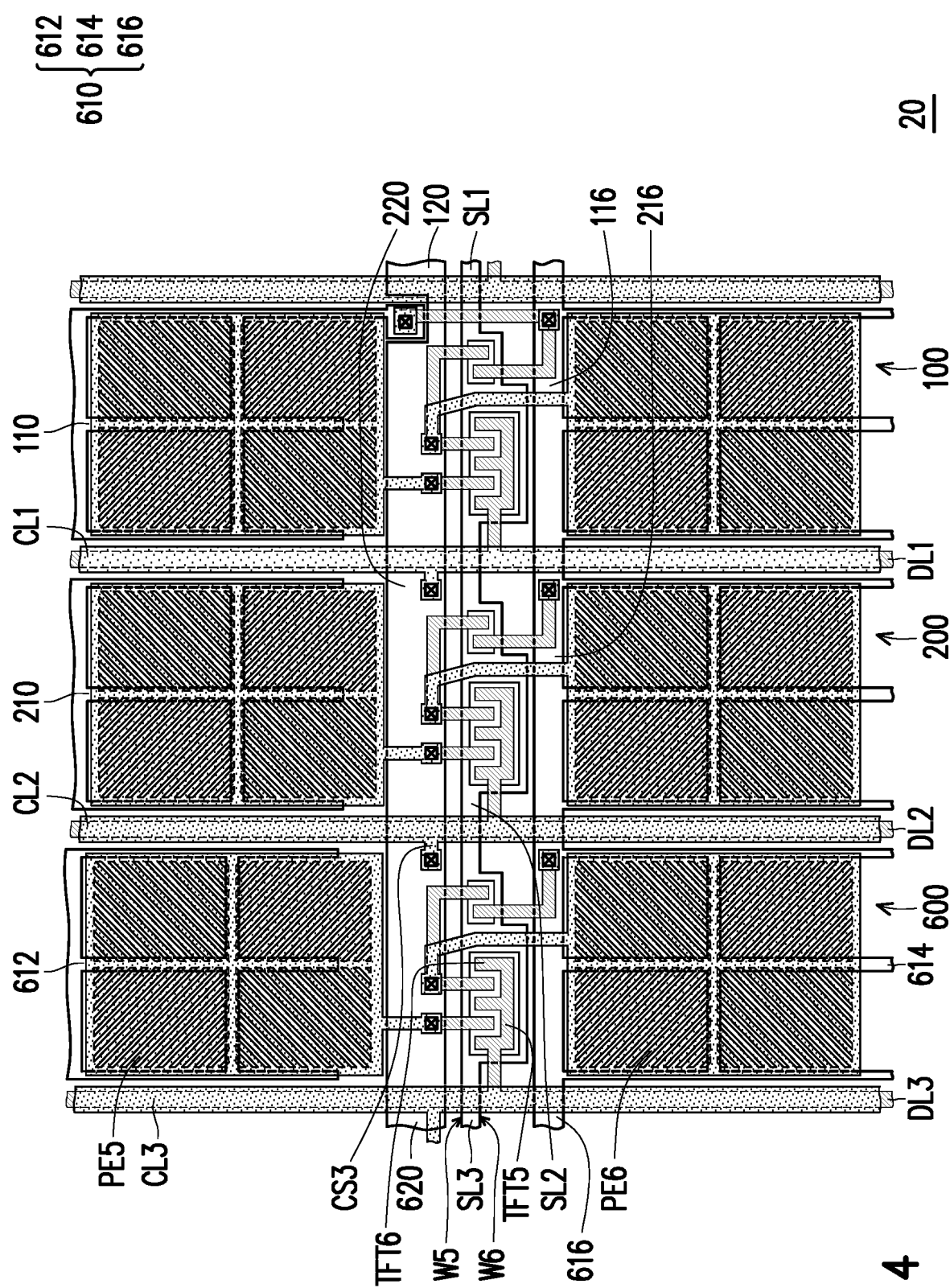
FIG. 4 is a top view of a pixel array according to further another embodiment of the invention.

FIG. 4 is a top view of a pixel array 20 according to further another embodiment of the invention. It should be noted that, the embodiment of FIG. 4 adopts the reference numbers and part of the content in the embodiment of FIG. 1A to FIG. 1E, where identical or similar reference numbers are used to indicate identical or similar components, and repeated description for the same technical contents is omitted. The omitted part of the description can refer to the foregoing embodiments, which are not repeated in the following embodiments.

With reference to FIG. 4, the pixel array 20 includes the pixel unit 100, the pixel unit 200 and a pixel unit 600, where the pixel unit 600 is similar to the pixel unit 200.

In the pixel array 20, the second scan line SL2 electrically connect the first scan line SL1 to the third scan line SL3, and the second data line DL2 is located between the first data line DL1 and the third data line DL3. In an embodiment, extending directions of the first data line DL1, the second data line DL2 and the third data line DL3 are substantially identical, and extending directions of the first scan line SL1, the second scan line SL2 and the third scan line SL3 are substantially identical.

The fifth pixel electrode PE5 and the sixth pixel electrode PE6 are respectively disposed on the first side W5 of the third scan line SL3 and the second side W6 of the third scan line SL3. The fifth switch element TFT5 is electrically connected to the third scan line SL3, the third data line DL3 and the fifth pixel electrode PE5. The sixth switch element TFT6 is electrically connected to the sixth pixel electrode PE6.

A fourth common line 620 is located on the first side W5 of the third scan line SL3. The fifth common line CL2 is electrically connected to the fourth common line 620. In the present embodiment, the fifth common line CL2 is disposed intersecting with the fourth common line 620. A second connection structure CS3 electrically connect the fourth common line 620 to the fifth common line CL2. The first common line 120, the second common line 220, the third common line CL1, the fourth common line 620 and the fifth common line CL2 are electrically connected to the first voltage.

In addition, in an embodiment, the third common line CL1 is located above the first data line DL1, the fifth common line CL2 is located above the second data line DL2, and the sixth common line CL3 is located above the third data line DL3. The first common line 120, the second common line 220, the third common line CL1, the fourth common line 620, the fifth common line CL2 and the sixth common line CL3 are electrically connected to a first voltage.

A third conductive line 610 includes a fifth extending portion 612 and a sixth extending portion 614. The fifth extending portion 612 is located on the first side W5 of the third scan line SL3, and the sixth extending portion 614 is located on the second side W6 of the third scan line SL3. In an embodiment, the fifth extending portion 612 and the sixth extending portion 614 extend along the extending direction of the third data line DL3, and the third conductive line 610 further includes a third branch portion 616 extending along the extending direction of the third scan line SL3. The first branch portion 116, the second branch portion 216 and the third branch portion 616 are electrically connected to each other. In the present embodiment, the first conductive line 110, the second conductive line 210 and the third conductive line 610 are electrically connected to a second voltage.

In an embodiment, a quantity ratio of the connection lines to the connection structures in the pixel array is 1 to 2, but the invention is not limited thereto. In other embodiments, the quantity ratio of the connection lines to the connection structures in the pixel array may be adjusted based on actual requirements.

Based on the above, the first conductive line 110, the second conductive line 210 and the third conductive line 610 in the pixel array 20 of the present embodiment are applied with the second voltage different from the first voltage. Accordingly, the transmittance of the liquid crystal display device may be significantly increased by utilizing the voltage difference between the first voltage and the second voltage. In addition, when a pixel unit is damaged, the damaged pixel unit can be repaired into the dark spot through the first common line 120, the second common line 220, the third common line CL1, the fourth common line 620, the fifth common line CL2 or the sixth common line CL3.

Figure 5:
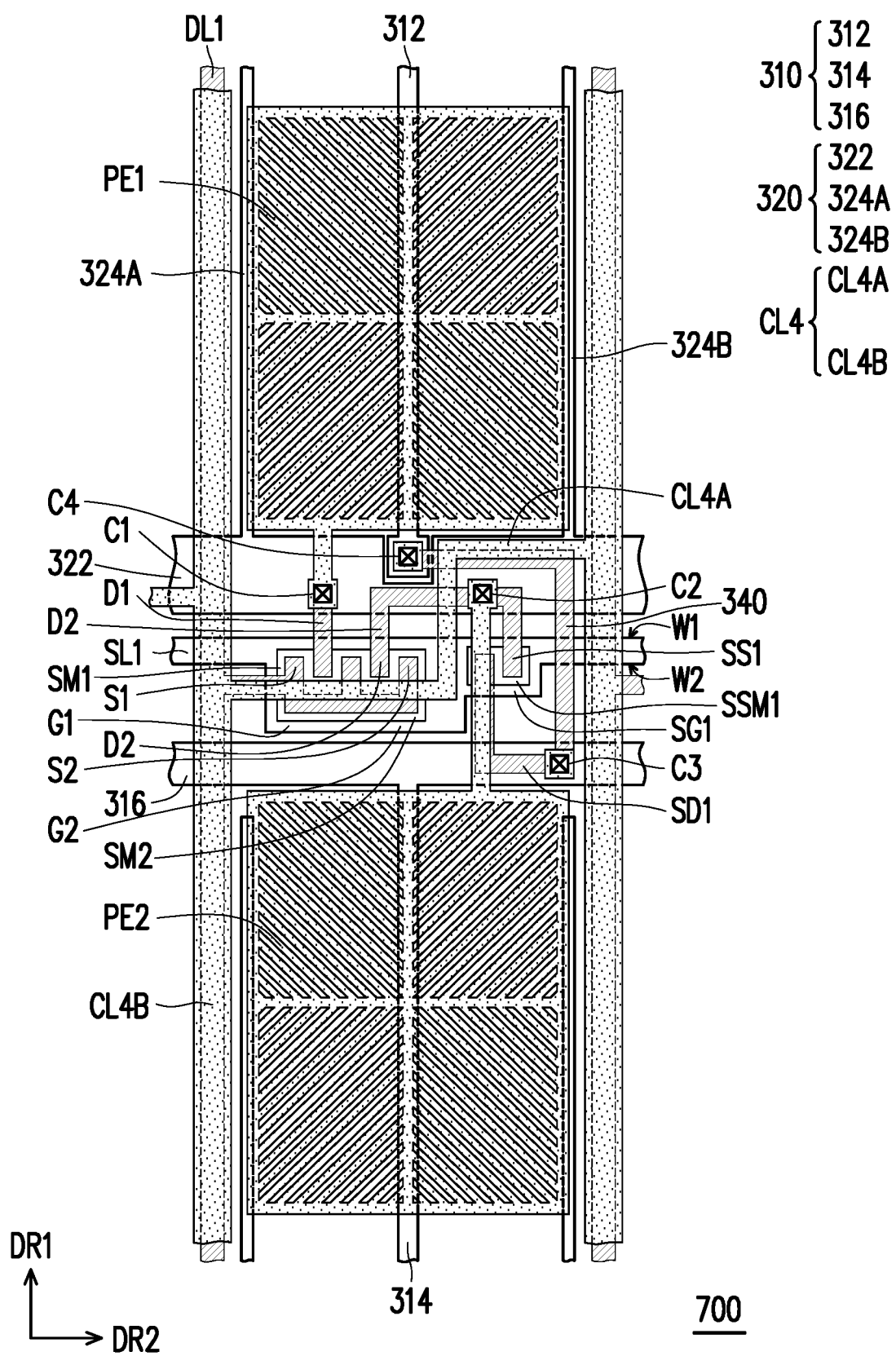
FIG. 5 is a top view of a pixel unit in a pixel array according to further another embodiment of the invention.

FIG. 5 is a top view of a pixel unit in a pixel array according to further another embodiment of the invention. It should be noted that, the embodiment of FIG. 5 adopts the reference numbers and part of the content in the embodiment of FIG. 2A, where identical or similar reference numbers are used to indicate identical or similar components, and repeated description for the same technical contents is omitted. The omitted part of the description can refer to the foregoing embodiments, which are not repeated in the following embodiments.

The pixel array of the present embodiment includes a pixel unit 700, and the embodiment of FIG. 5 is similar to the embodiment of FIG. 2A, except that a third common line CL4 of the embodiment of FIG. 5 is different from the third common line CL1 of the embodiment of FIG. 2A.

In the present embodiment, the third common line CL4 includes a third extending portion CL4A and a fourth extending portion CL4B. At least part of the third extending portion CL4A extends along the extending direction DR2 of the first scan line SL1, and the fourth extending portion CL4B extends along the extending direction DR1 of the first data line DL1. The fourth extending portion CL4B and the third extending portion CL4A are connected together, and the fourth extending portion CL4B is disposed on the first data line DL1. The first common line 320 and the third common line CL4 are electrically connected to a first voltage, and the first conductive line 310 is electrically connected to a second voltage.

In an embodiment, the first scan line SL1, the first conductive line 310, and the first common line 320 are made of the same layer. In an embodiment, the first data line DL1 and the first connection line 340 are made of the same layer. In an embodiment, the first pixel electrode PE1, the second pixel electrode PE2 and the third common line CL4 are made of the same layer.

Based on the above, the first conductive line 310 in the pixel array of the present embodiment is applied with the second voltage different from the first voltage. Accordingly, the transmittance of the liquid crystal display device may be significantly increased by utilizing the voltage difference between the first voltage and the second voltage. In addition, when a pixel unit is damaged, the damaged pixel unit can be repaired into the dark spot through the first common line 320 or the third common line CL4.

In summary, the first conductive line and the second conductive line in the pixel array of the invention are applied with the second voltage different from the first voltage, such that the transmittance of the liquid crystal display device can be significantly increased by utilizing the voltage difference between the first voltage and the second voltage. Moreover, a damaged pixel unit can be repaired into the dark spot through the first common line, the second common line or the third common line. In an embodiment, the first conductive line and the second conductive line in the pixel array commonly constitute a mesh structure in the extending direction of the scan line and the extending direction of the data line, such that the pixel array can provide a more uniform voltage distribution. In an embodiment, the first common line, the second common line and the third common line in the pixel array commonly constitute a mesh structure in the extending direction of the scan line and the extending direction of the data line, such that the pixel array can provide a more uniform voltage distribution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array, comprising:
   a scan line;
   a data line, disposed intersecting with the scan line;
   a first pixel electrode and a second pixel electrode, respectively disposed on a first side of the scan line and a second side of the scan line;
   a first switch element, electrically connected to the scan line, the data line and the first pixel electrode;
   a second switch element, electrically connected to the second pixel electrode;
   a first common line, located on the first side of the scan line;
   a first conductive line, comprising a first extending portion and a second extending portion, wherein the first extending portion is located on the first side of the scan line, and the second extending portion is located on the second side of the scan line;
   a connection line, crossing the scan line so as to electrically connect the first extending portion to the second extending portion; and
   a third common line, the third common line comprising a third extending portion and a fourth extending portion, wherein the third extending portion extends along an extending direction of the scan line, the fourth extending portion is disposed on the data line, and the fourth extending portion is connected to the third extending portion,
   wherein the first common line and the third common line are electrically connected to a first voltage, the first conductive line is electrically connected to a second voltage, and the scan line and the first conductive line are made of the same layer.

2. The pixel array as recited in claim 1, wherein the first extending portion and the second extending portion extend along an extending direction of the data line, and the first conductive line further comprises:
   a first branch portion, extending along the extending direction of the scan line, and being connected to the first extending portion or the second extending portion.

3. The pixel array as recited in claim 1, wherein the first common line comprises a groove, and at least part of the first extending portion of the first conductive line is located in the groove.

4. The pixel array as recited in claim 1, further comprising: a sharing element, wherein the second pixel electrode and the second switch element are electrically connected to the sharing element, and the second switch element is electrically connected to the scan line and electrically connected to the data line through the first switch element.

5. The pixel array as recited in claim 1, wherein the first common line comprises:
   a main portion, extending along the extending direction of the scan line; and two trunk portions, extending along an extending direction of the data line and being connected to the main portion, the two trunk portions overlapping with an edge of the first pixel electrode, and the first extending portion of the first conductive line being located between the two trunk portions.

6. The pixel array as recited in claim 1, wherein the scan line, the first common line, and the first conductive line are made of the same layer.

7. The pixel array as recited in claim 1, wherein the data line and the connection line are made of the same layer.

8. The pixel array as recited in claim 1, wherein the first pixel electrode, the second pixel electrode, and the third common line are made of the same layer.

9. A pixel array, comprising:
a scan line;
a data line, disposed intersecting with the scan line;
a first pixel electrode and a second pixel electrode, respectively disposed on a first side of the scan line and a second side of the scan line;
a first switch element, electrically connected to the scan line, the data line and the first pixel electrode;
a second switch element, electrically connected to the second pixel electrode;
a first common line, located on the first side of the scan line;
a first conductive line, comprising a first extending portion and a second extending portion, wherein the first extending portion is located on the first side of the scan line, the second extending portion is located on the second side of the scan line, and the first extending portion and the second extending portion are structurally separated from each other at where the scan line is located;
a connection line, crossing the scan line so as to electrically connect the first extending portion to the second extending portion; and
a third common line, the third common line comprising a third extending portion and a fourth extending portion, wherein the third extending portion extends along an extending direction of the scan line, the fourth extending portion is disposed on the data line, and the fourth extending portion is connected to the third extending portion,
wherein the first common line and the third common line are electrically connected to a first voltage, and the first conductive line is electrically connected to a second voltage.

\* \* \* \* \*